(12) United States Patent
Higgs et al.

(10) Patent No.: US 12,303,776 B1
(45) Date of Patent: May 20, 2025

(54) MODULAR CONTROLLER SYSTEM FOR SINGLE HANDED USE

(71) Applicants: Spencer Ryan Higgs, Havelock, NC (US); David Christopher Starnes, Newport, NC (US); Robert Howell Duren, IV, Richlands, NC (US)

(72) Inventors: Spencer Ryan Higgs, Havelock, NC (US); David Christopher Starnes, Newport, NC (US); Robert Howell Duren, IV, Richlands, NC (US)

( * ) Notice: Subject to any disclaimer, the term of this patent is extended or adjusted under 35 U.S.C. 154(b) by 0 days.

(21) Appl. No.: 18/984,602

(22) Filed: Dec. 17, 2024

Related U.S. Application Data

(63) Continuation of application No. 18/802,856, filed on Aug. 13, 2024.

(51) Int. Cl.
    *A63F 13/24*      (2014.01)
    *A63F 13/22*      (2014.01)

(52) U.S. Cl.
    CPC .............. *A63F 13/24* (2014.09); *A63F 13/22* (2014.09)

(58) Field of Classification Search
    CPC ................................. A63F 13/24; A63F 13/22
    See application file for complete search history.

(56) References Cited

U.S. PATENT DOCUMENTS

| | | | |
|---|---|---|---|
| 8,430,753 | B2 | 4/2013 | Ikeda et al. |
| 10,675,546 | B2 | 6/2020 | Muramatsu et al. |
| 11,027,192 | B1 | 6/2021 | Zust |
| 11,114,267 | B2 | 9/2021 | Paquette et al. |
| 2003/0054883 | A1 | 3/2003 | Sakiyama et al. |
| 2009/0054146 | A1 | 2/2009 | Epstein et al. |
| 2014/0200085 | A1 | 7/2014 | Bares et al. |
| 2018/0161670 | A1 | 6/2018 | Boev |
| 2021/0178255 | A1* | 6/2021 | Basara ............... A63F 13/837 |
| 2023/0090962 | A1 | 3/2023 | Franco Giese |
| 2023/0112293 | A1* | 4/2023 | Blacoe ............... A63F 13/22 |
| | | | 463/37 |

* cited by examiner

*Primary Examiner* — Peter J Iannuzzi
(74) *Attorney, Agent, or Firm* — Ashley D. Johnson; Dogwood Patent and Trademark Law

(57) ABSTRACT

The invention is a hand-held controller configured to be grasped and operated with one hand. The hand-held controller serves as an alternative to standard two-hand controllers for giving input to videogames or other programs. The hand-held controller includes a plurality of input devices configured to be comfortably operated with the user's fingers when the hand-held controller is grasped. Advantageously, the controller base includes a plurality of rotatable buttons that can be positioned according to individual player comfort levels and disabilities.

20 Claims, 14 Drawing Sheets

US 12,303,776 B1

MODULAR CONTROLLER SYSTEM FOR SINGLE HANDED USE

FIELD OF THE INVENTION

The presently disclosed subject matter is directed to a modular controller system that accommodates users with use of only a single hand. Specifically, the disclosed controller allows a person with the use of only one arm or hand to fully grasp and manipulate the controller. The presently disclosed subject matter also includes methods of making and using the disclosed system.

BACKGROUND OF THE INVENTION

Individuals that suffer from mobility impairment are deprived of the full use of one or more limbs, such as the arms. For example, a user may have a limited amount of motor control in one or both fingers or hands. Similarly, individuals with full or partial amputation of an arm/hand experience challenges performing everyday tasks. For instance, video games provide a high level of enjoyment to users, but traditional game controllers have joysticks and small buttons that require precise motor control. Further, technology has become more advanced and often requires multiple controls used simultaneously to fully navigate the virtual world (e.g., in the field of robotics, aviation, vehicle control, video games, etc.). With numerous buttons and other manipulation elements that often require both hands for use, conventional controllers present a significant barrier to entry for many users with disabilities. Specifically, individuals with limited arm/hand mobility and amputees have been unable to properly use conventional controllers due to their physical limitations. As such, conventional controllers present a significant barrier to entry for many users. It would therefore be advantageous to provide an interactive controller suitable for individuals with arm/hand mobility issues and/or amputees.

SUMMARY OF THE INVENTION

In some embodiments, the presently disclosed subject matter is directed to a controller defined by a base. The base comprises a top surface comprising an upper contact that provides for releasable attachment of an associated first accessory. The base also includes an opposed bottom surface comprising a lower contact that provides for releasable attachment of an associated second accessory. The base includes an elongated handle positioned adjacent to the top surface, the handle comprising a plurality of rotatable handle buttons. The base includes a foundation positioned between the handle and the bottom surface. The controller further comprises one or more accessories comprising a plurality of accessory buttons, wherein each accessory is configured to releasably attach to the upper contact, lower contact, or both. The handle buttons can be rotated from a first orientation to a second orientation to accommodate left and right handed use.

In some embodiments, the controller is configured as a video game controller.

In some embodiments, the handle is angled relative to the top surface and the foundation. The term "angled" refers to a non-vertical orientation.

In some embodiments, the handle buttons are positioned vertically on the handle. The term "vertically" or "vertical" refers to a position at right angles to a horizontal plane (e.g., in a direction, or having an alignment, such that the top is directly above the bottom).

In some embodiments, the handle buttons are selected from push buttons, toggle switches, triggers, directional pads, analog sticks, joysticks, touchscreens, rollerballs, or combinations thereof.

In some embodiments, the accessory buttons are selected from push buttons, toggle switches, triggers, directional pads, analog sticks, joysticks, touchscreens, rollerballs, or combinations thereof.

In some embodiments, each handle button is rotatable about 180 degrees from the first orientation to the second orientation.

In some embodiments, each handle button is independently rotatable relative to one or more other handle buttons.

In some embodiments, each handle button is configured to rotate up to about 180 degrees from the first orientation to the second orientation (e.g., each handle button can be rotated anywhere between 0-180 degrees). Thus, a handle button can remain in an initial orientation and not be moved. Alternatively, the handle button can be rotated a small amount (e.g., about 5, 10, 15, 20, 25, 30, 35, 40, or 45 degrees) from the first orientation. The handle button can be moderately moved (e.g., about 50, 55, 60, 65, 70, 75, 80, 85, 90, 95, 100, 110, 105, 115, 120, 125, 130 degrees) from the first orientation. The handle can also be moved a large distance from the first orientation (e.g., about 135, 140, 145, 150, 155, 160, 165, 170, 175, 180 degrees).

In some embodiments, the base top surface and bottom surface include planar regions. The term "planar" refers to a generally flat shape.

In some embodiments, the upper contact comprises an indented region. The term "indented" used herein refers to a dent, a cut-out, a groove, a cut, etc.

In some embodiments, the lower region includes a cutout region.

In some embodiments, the presently disclosed subject matter is directed to a method of performing an action on a receiving system using the disclosed controller. Specifically, the method includes adjusting the rotatable handle buttons to accommodate one or more fingers of a user. The method includes releasably attaching at least one of the accessories to the top contact, lower contact, or both. The receiving system can be controlled using a single hand of a user and the single hand of the user has access to both the handle buttons and the accessory buttons.

In some embodiments, the presently disclosed subject matter is directed to a method of playing a video game system using the disclosed controller. Specifically, the method includes adjusting the rotatable handle buttons to accommodate one or more fingers of a user. The method includes releasably attaching at least one of the accessories to the top contact, lower contact, or both, wherein the video game can be played using a single hand of a user and wherein the single hand of the user has access to both the handle buttons and the accessory buttons.

In some embodiments, the accessories are releasably attached using as snap fit, push fit, magnets, mechanical elements, or combinations thereof.

DETAILED DESCRIPTION OF THE INVENTION

Figure 1:
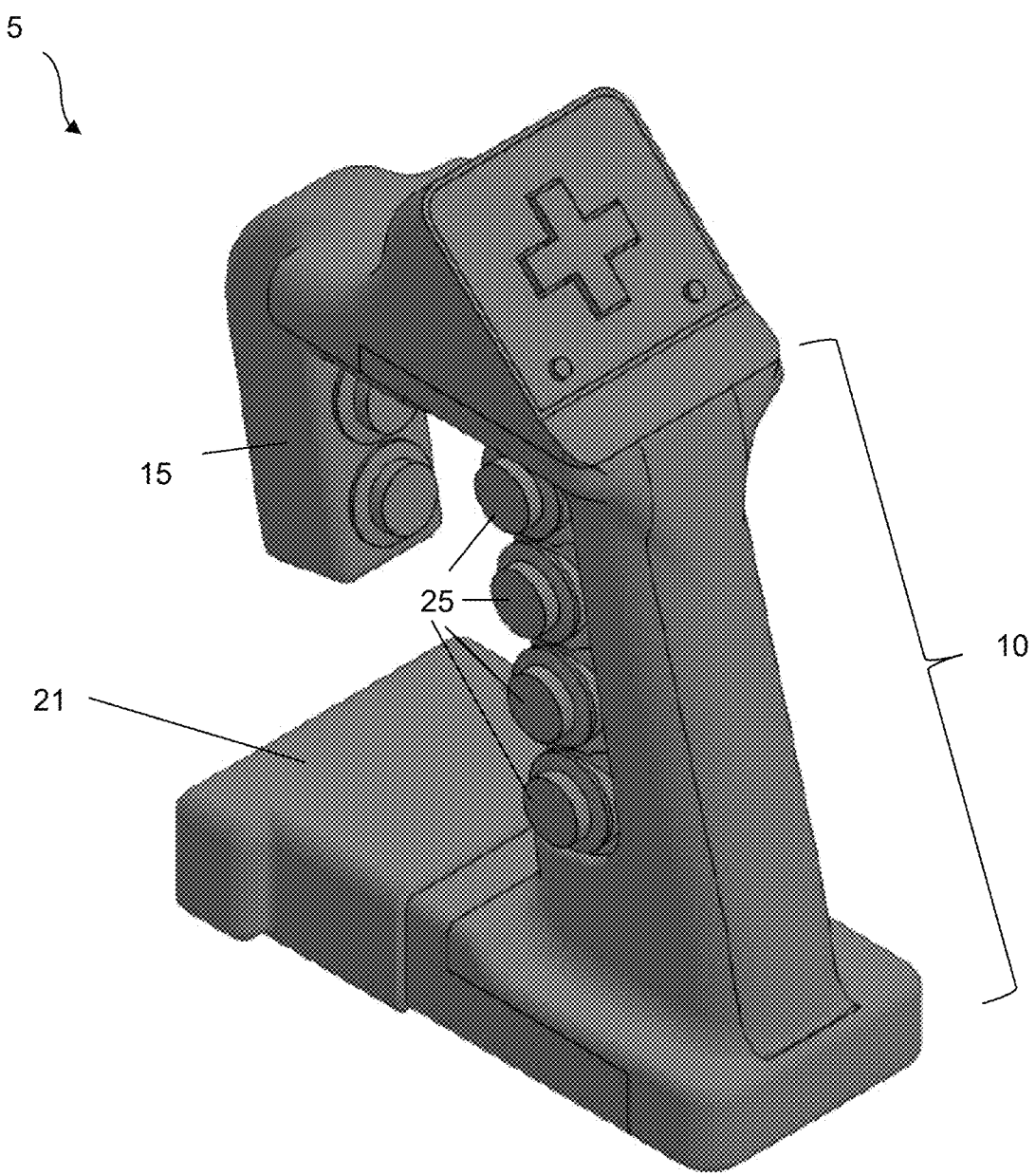
FIG. 1 is a perspective view of a modular game controller in accordance with some embodiments of the presently disclosed subject matter.

For the purpose of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments+/−20%, in some embodiments+/−10%, in some embodiments+/−5%, in some embodiments+/−1%, in some embodiments+/−0.5%, and in some embodiments+/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

The presently disclosed subject matter is directed to a controller that can be effectively used by individuals that are missing one hand and/or individuals with limited mobility in one hand or arm. The term "controller" includes a device that provides input to a receiver, such as (but not limited to) a video game. Essentially, the controller facilitates interaction between a user and a device (such as a gaming system, drone, vehicle, robotic element, etc.). Thus, the hand-held controller serves as a peripheral device to give input to a receiving system. The receiving system is capable of running and executing a program (such as a video game) with which the user interacts by operating the controller. The receiving system can be a personal computer (PC), a gaming console, a smartphone, robotics console, aviation device, or any other system capable of running and executing a program and receiving input from the disclosed controller. Advantageously, the hand-held controller described herein can be operated with one hand to provide input to a computerized machine (or receiver) that interfaces with and provides inputs to a program running on a computing device. Further, the disclosed controller includes a set of modules for either left handed or right handed use, allowing a person with the use of only one arm/hand to take full advantage of the controller.

FIG. 1 illustrates one embodiment of controller 5. As shown, the controller includes base 10 that acts as a support and/or handle for the controller base receptacle that includes circuitry. The base includes a plurality of rotatable buttons 25 that can be adjusted as desired by the user, such as to accommodate both left and right hand users. The controller can be customized and includes one or more accessories 15 that add different arrangements of various controller elements, such as buttons, triggers, directional pads, analog sticks, joysticks, touch screens, rollerballs, and the like. The controller also includes removable circuit board 21. Accordingly, controller 5 allows a user to effectively interact with a variety of receivers (e.g., video games or video game systems) using a single controller (e.g., two controllers are not required). In this way, users with a variety of disabilities (such as players with use of only one hand or arm) can effectively enjoy and provide input to a receiver (such as a robotics unit, drone, video game system, and the like).

Figure 2A:
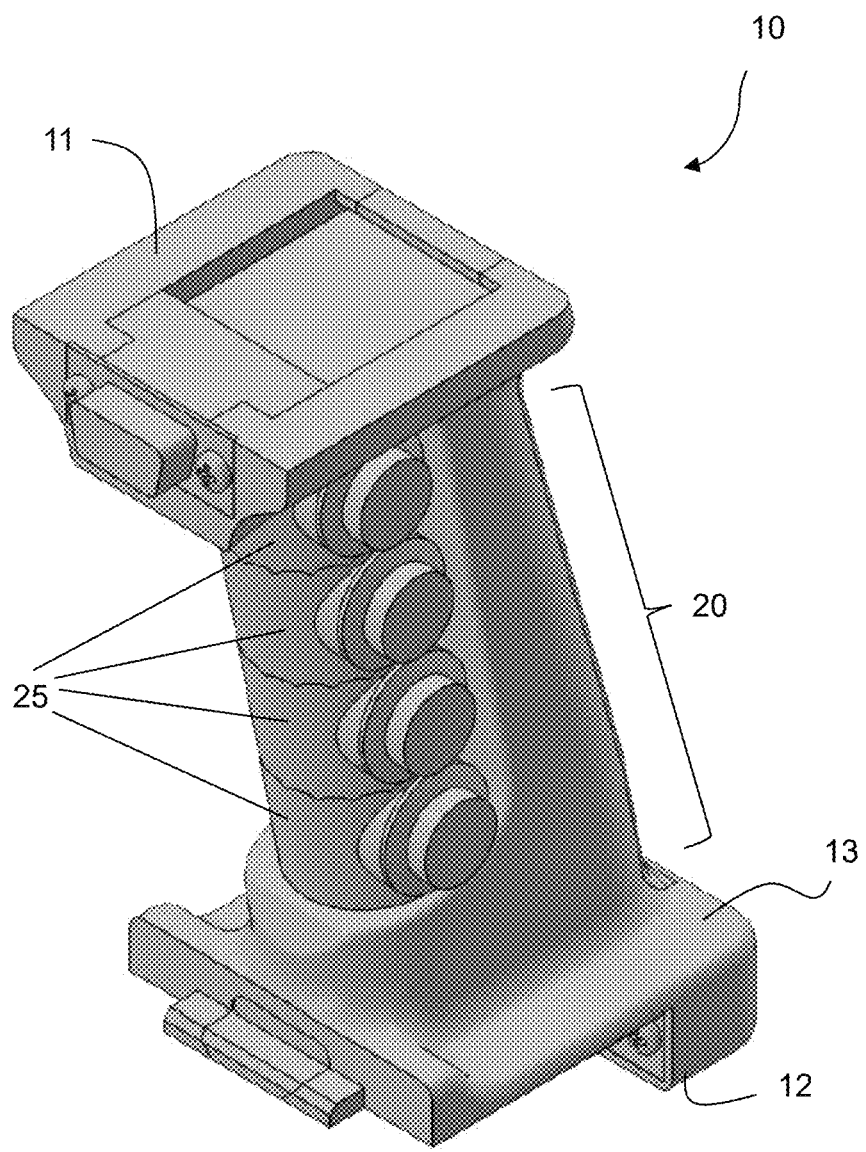
FIG. 2a is a perspective view of a modular game controller base in accordance with some embodiments of the presently disclosed subject matter.
Figure 2B:
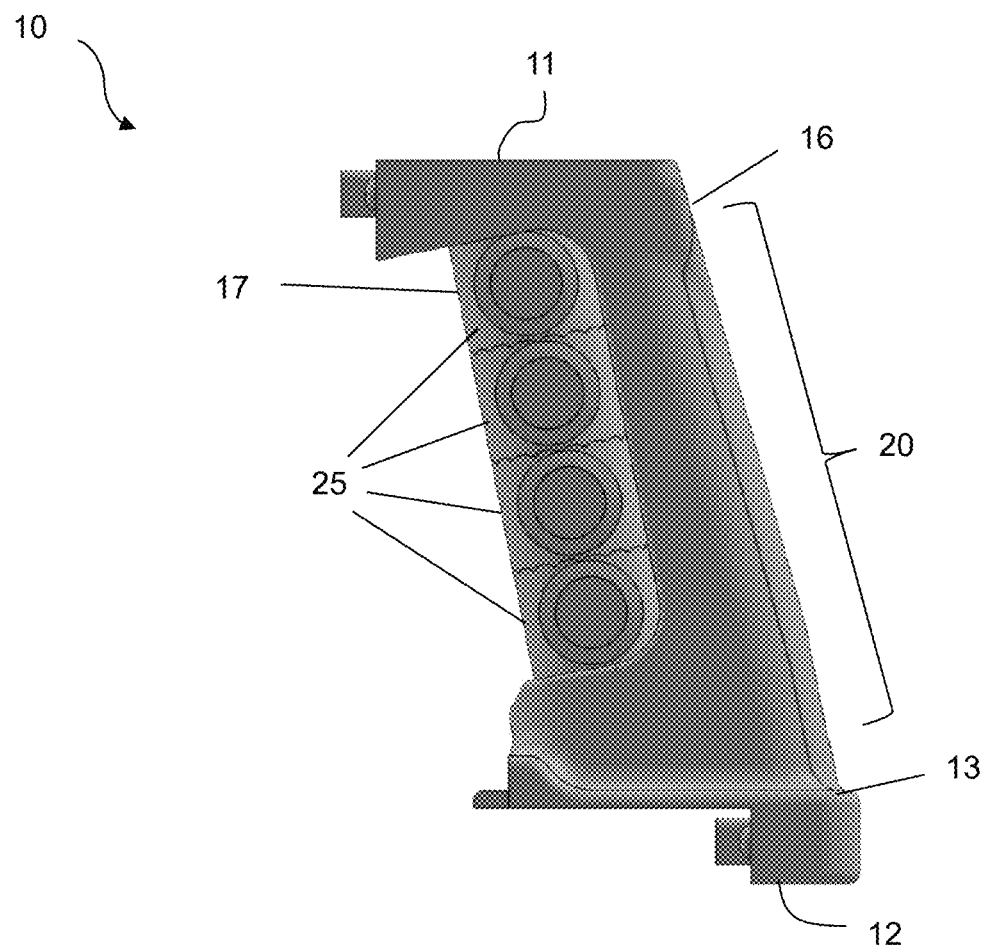
FIG. 2b is a side plan view of the modular game controller base of FIG. 2a in accordance with some embodiments of the presently disclosed subject matter.

As noted above, controller 5 includes base 10 as illustrated in FIGS. 2a and 2b. The base includes top surface 11 and opposed bottom surface 12 that can each be used to releasably couple one or more accessories as discussed in detail below. The base also includes user-facing side 16 (the side that faces the user's body) and device-facing side 17 (facing the video gaming device, receiver display, etc.). The base further comprises handle 20 that can easily be gripped by a user's hand. In some embodiments, the handle can be elongated to allow the user's fingers and thumb to wrap around the controller for easy gripping. The base comprises foundation 13 with a larger diameter compared to the handle, allowing for greater controller balance and stability when in use. In some embodiments, the handle can be oriented at an angle between the top and the foundation, as shown in FIG. 2b.

Handle 20 is shaped and dimensioned to be grasped by a player's single hand. To this end, the handle may be ergonomically contoured to allow for comfortable grasping. For example, the handle can include a cylindrical or semi-cylindrical shape with two planar surfaces. In some embodiments, the palm of a player rests naturally along the handle (e.g., at user-facing side 16). Optionally, all or a portion of handle 20 can include a gripping surface material or an adhesive to prevent slippage between the palm and/or fingers of a player and controller 5. The coverage area of the material may be an externally applied adhesive coating or the material may be impregnated within the curved surface itself.

The handle includes one or more modular buttons 25 that can be added, adjusted, and removed as desired. For example, the buttons can be oriented for right-handed or left-handed use (e.g., right-handed use as depicted in FIG. 2a, allowing the fingertips of a user to access buttons 25). Thus, the base is configured to allow a user to remove buttons 25 and replace with a different set of buttons, such as buttons of a different shape/size, fewer/more buttons, and/or position of the buttons. As such, the controller is modular.

The finger-operated buttons may be disposed longitudinally on the handle portion of the base such that the user may operate the buttons with all four fingers. Specifically, buttons 25 may be mounted in a row longitudinally or otherwise aligned on one face of the handle and positioned such that the buttons rest under a fingertip of each finger of the user (with exception of the thumb in some embodiments).

In some embodiments, the buttons are curved to match the contours of the housing and to comfortably match the bent fingers of the user in use (e.g., while playing a video game). The placement of finger buttons down one face of handle 20 remove the need for a user to remove the placement of their thumb to operate additional actions controlled by the finger buttons. The handle can optionally include one or more radially extended recesses that allow the user's fingers to get an easy grip on the handle. The user's palm can rest comfortably on an opposed surface of the handle (which can be padded in some embodiments).

Buttons 25 can be pressed by one or more fingers on a user's hand. The buttons can have a spring mechanism or compressible material under finger button to allow bias to the original button position. The buttons can be constructed from any suitable material, such as (but not limited to) rubber, plastic, or combinations thereof.

It should be appreciated that the modular buttons illustrated in FIGS. 2a and 2b are not limited. Specifically, buttons 25 are not limited to the round shape shown in the figures. Rather, the buttons can be configured in any shape, such as triangular, square, oval, rectangular, and the like. Further, the number of buttons is not limited, and the base can include any desired number of buttons (e.g., 1, 2, 3, 4, 5, 6, 7, 8, 9, 10, or more).

Continuing, buttons 25 are not limited to any particular type of button (e.g., push button). To this end, the term "button" refers to any interactive element that can be used to control a video game. Thus, the buttons can take the form of a push button 25a, toggle switch 25b, trigger 25c, directional pad 25d, analog stick 25e, joystick 25f, touchscreen 25g, rollerball 25h, or combinations thereof as illustrated in FIGS. 3a-3h.

Figure 3A:
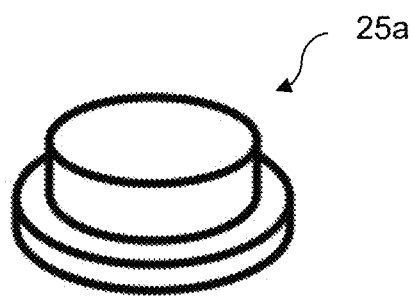
FIG. 3a is a perspective view of a controller push button in accordance with some embodiments of the presently disclosed subject matter.
Figure 3B:
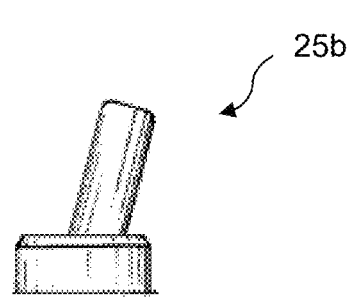
FIG. 3b is a side plan view of a controller toggle switch in accordance with some embodiments of the presently disclosed subject matter.
Figure 3C:
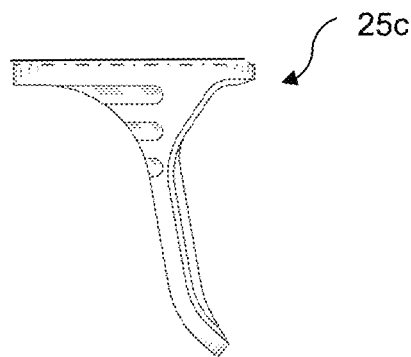
FIG. 3c is a side plan view of a controller trigger in accordance with some embodiments of the presently disclosed subject matter.
Figure 3D:
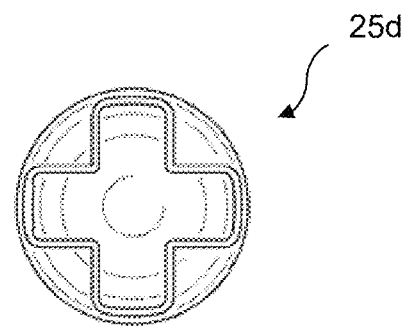
FIG. 3d is a top plan view of a controller directional pad in accordance with some embodiments of the presently disclosed subject matter.
Figure 3E:
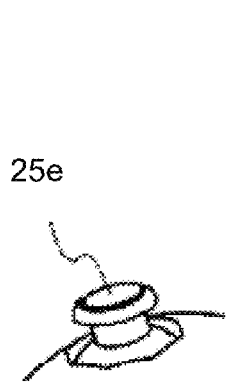
FIG. 3e is a perspective view of a controller analog stick in accordance with some embodiments of the presently disclosed subject matter.
Figure 3F:
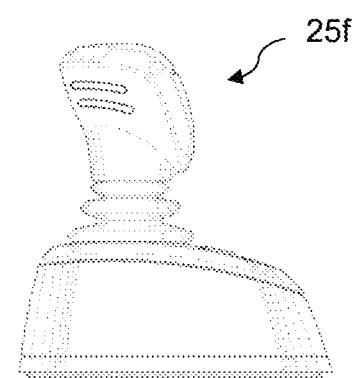
FIG. 3f is a perspective view of a controller joystick in accordance with some embodiments of the presently disclosed subject matter.
Figure 3G:
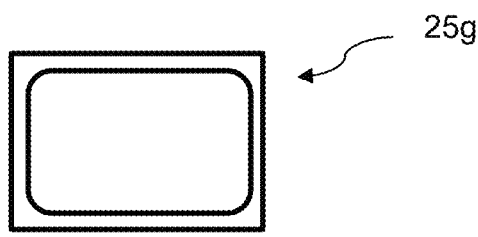
FIG. 3g is a top plan view of a controller touchscreen in accordance with some embodiments of the presently disclosed subject matter.
Figure 3H:
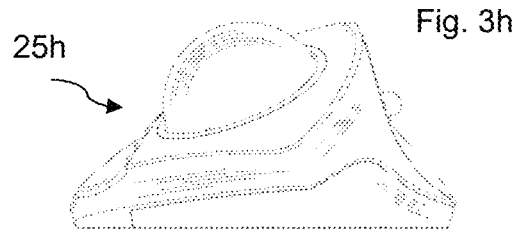
FIG. 3h is a perspective view of a controller joystick comprising a rollerball in accordance with some embodiments of the presently disclosed subject matter.

The term "push button" refers to a simple switch mechanism with a flat surface in some embodiments to accommodate the human finger or hand, as illustrated in FIG. 3a. "Toggle switch" refers to a switch that is manually activated by a mechanical lever, handle, or rocking mechanism, as shown in FIG. 3b. "Trigger" refers to a type of switch that can be initiated by actuation of a user's finger, typically in association with the firing of a weapon action, as shown in FIG. 3c. "Directional pad" (or D-pad) refers to a flat, typically thumb-operated, directional control that operates using four internal pushbuttons (arrayed at 90° angles in some embodiments), as shown in FIG. 3d. The term "analog stick" refers to an input device that includes a protrusion, where input is based on the position of the protrusion relative to a default center position, as illustrated in FIG. 3e. The term "joystick" refers to an input device that includes a stick that pivots on a base and reports the angle or direction of the stick relative to a neutral central position, as shown in FIG. 3f. The term "touchscreen" refers to a physical structure that enables the user to interact with the game by touching areas on the screen and provides information to a user through a display, as shown in FIG. 3g. The term "rollerball" refers to a pointing device featuring a ball held by a socket that includes sensors to detect rotation of the ball, as illustrated in FIG. 3h.

Each button 25 can be added or removed from handle 20, thereby allowing a user to customize the controller to accommodate any of a wide variety of disabilities. Each button can be added or removed from the handle using conventional methods, such as (but not limited to) a snap-fit closure, magnets, the use of mechanical elements (e.g., clips, fasteners, and the like), push fit closure, or combinations thereof.

Figure 4A:
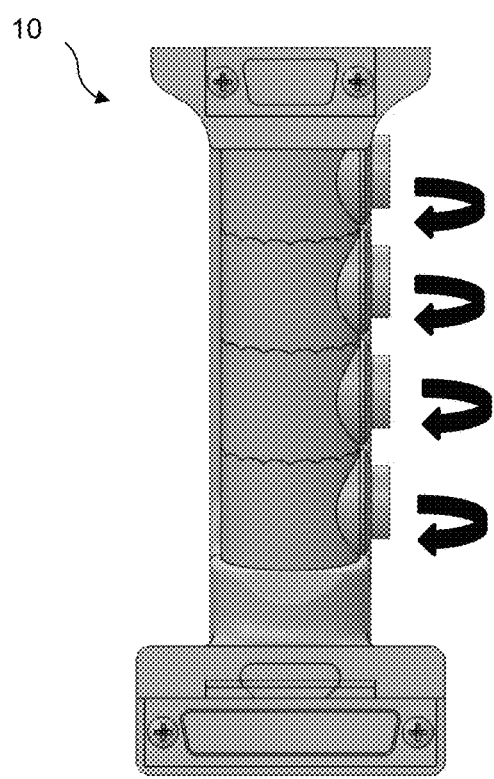
FIGS. 4a and 4b are front plan views of a controller base with rotated buttons in accordance with some embodiments of the presently disclosed subject matter.
Figure 4B:
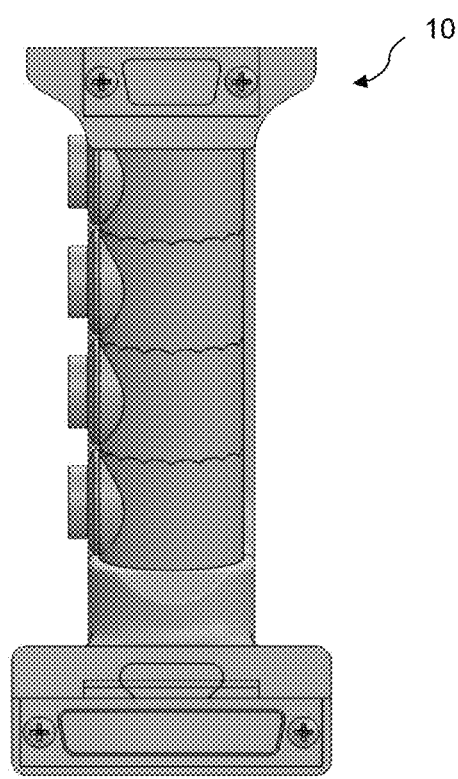
Figure 4C:
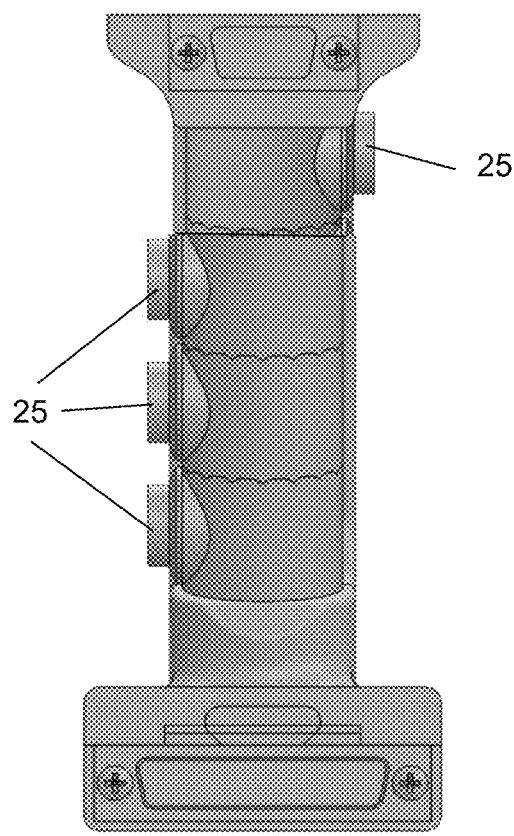
FIG. 4c is a front plan view of a controller base with a single rotated button in accordance with some embodiments of the presently disclosed subject matter.

Advantageously, each button 25 is rotatable 180 degrees (e.g., at least/no more than about 10, 20, 30, 40, 50, 60, 70, 80, 90, 100, 110, 120, 130, 140, 150, 160, 170, or 180 degrees) from a first position to a second position on the controller handle. For example, the controller can allow a user to switch from left to right-handed use (and vice versa) by rotating the buttons about 180 degrees, as shown in FIGS. 4a and 4b. Thus, the buttons on the controller handle can be rotated to accommodate both left and right handed users. Each button 25 can independently rotate relative to the other buttons, such that only one (or more than one) button can rotate to a second position while the remainder stay in a first, unrotated position, as shown in FIG. 4c. Thus, one or more buttons can be rotated fully or partially around the handle to accommodate a particular user's limitations. Accordingly, controller 5 can ergonomically fit the right or left hand of a user by rotating the buttons about the handle.

As is known in the art, the finger buttons can be connected to one or more switches connected to a circuit board that sends the appropriate signals to a microprocessor. The microprocessor compares that data with instructions in the game software for that specific input of the pressing of the finger buttons and triggers the appropriate response.

Figure 5A:
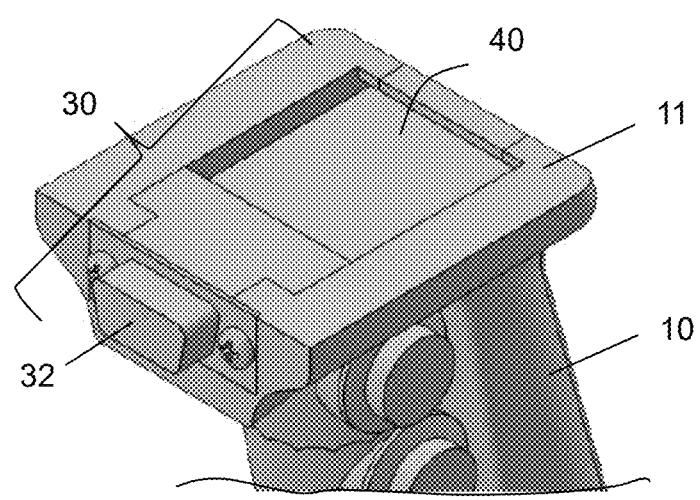
FIG. 5a is a fragmentary perspective view of a top face of a controller base in accordance with some embodiments of the presently disclosed subject matter.

As noted above, the controller includes a variety of attachments that can be added or removed as desired, allowing the controller to be used with different gaming systems and/or a variety of games. To this end, the base includes upper contact 30 positioned at or near top face 11 of the base, as shown in FIG. 5a. The top and/or bottom face of the base can be configured as a planar surface to facilitate easy coupling with a desired accessory. The upper contact can allow for releasable attachment of an associated accessory using any suitable mechanism such as snap fit, push fit, magnets, mechanical elements, and the like. Thus, in some embodiments, an accessory can include a male component that cooperates with a corresponding female component within contact 30 although any attachment mechanism can be used (e.g., snug-fit, snap-fit, or clamp connection). Thus, the mounting contact on the top or bottom face of the base can include any suitable surface, feature, shape, and/or structure configured to selectively mate with the mounting interface of an attachment.

In some embodiments, the upper contact can include a power connection 32, transmitting power to the accessory from the base. Connection of an accessory to the base can therefore be accomplished by releasably pairing the two items together until a user desires to remove the accessory (e.g., to replace it with a different accessory). For example, the base can include an indention 40 that is sized and shaped to cooperate with a protrusion on the accessory, allowing for attachment.

Figure 5B:
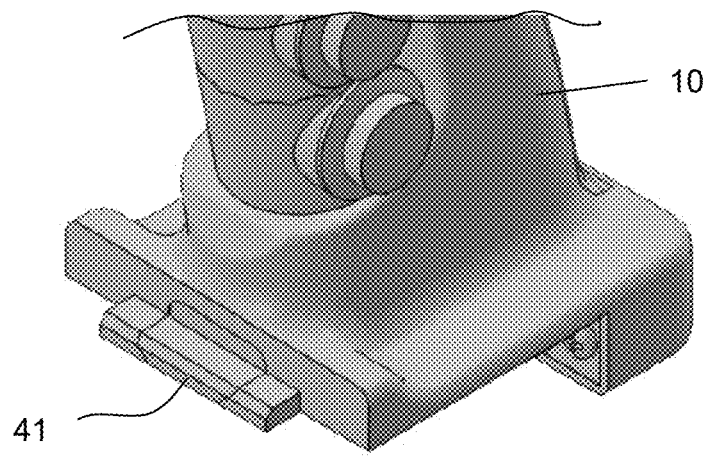
FIG. 5b is a fragmentary perspective view of a bottom face of a controller base in accordance with some embodiments of the presently disclosed subject matter.
Figure 5C:
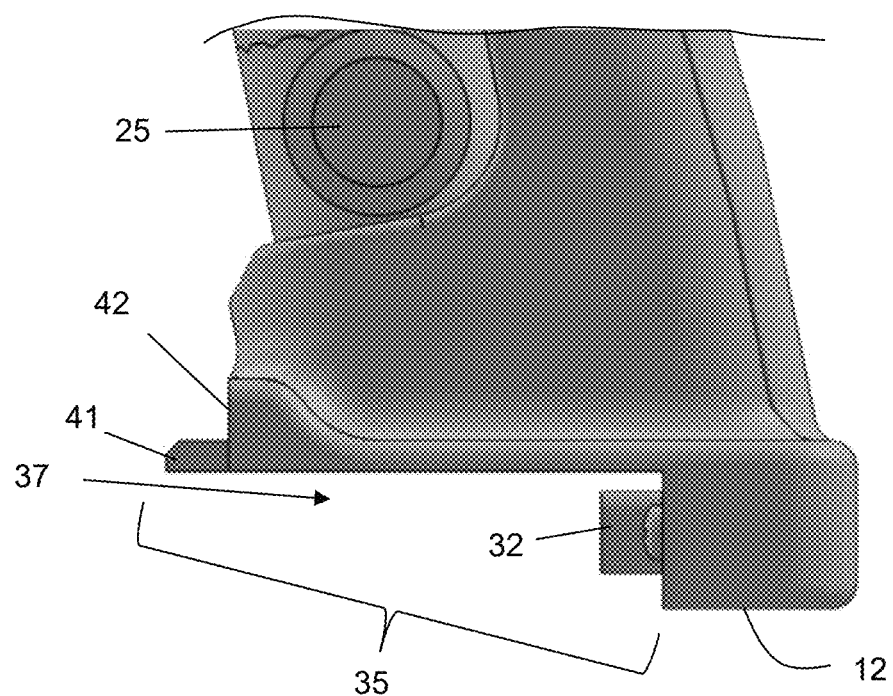
FIG. 5c is a fragmentary side plan view of a bottom face of a controller base in accordance with some embodiments of the presently disclosed subject matter.

The base can further include lower contact 35 positioned at or near bottom face 12 of the base, as shown in FIGS. 5b and 5c. In some embodiments, the base can include one or more cutouts 37 that facilitate connection of an accessory and/or removable circuit board 21. The term "removable circuit board" refers to a printed circuit that can be inserted and removed from the base to increase the controller's capabilities.

The term "cutout" refers to a space, void, or hole left after a first region from a substrate. As with the upper contact, the lower contact also allows for releasable attachment of one or more accessories or a removable circuit board using standard attachment mechanisms. In some embodiments, the base can include a medial contact positioned between the top and bottom faces of the base. For example, the base can include a ridge 41 that fits within an aperture on an accessory. The ridge can be positioned on any face of the base, such as front face 42. However, the connective elements are not limited and any conventional methods of attaching and releasing an accessory to a base can be used. In some embodiments, ridge 41 can be configured as a push lock that locks one or more rotating button cylinders in place.

Figure 6A:
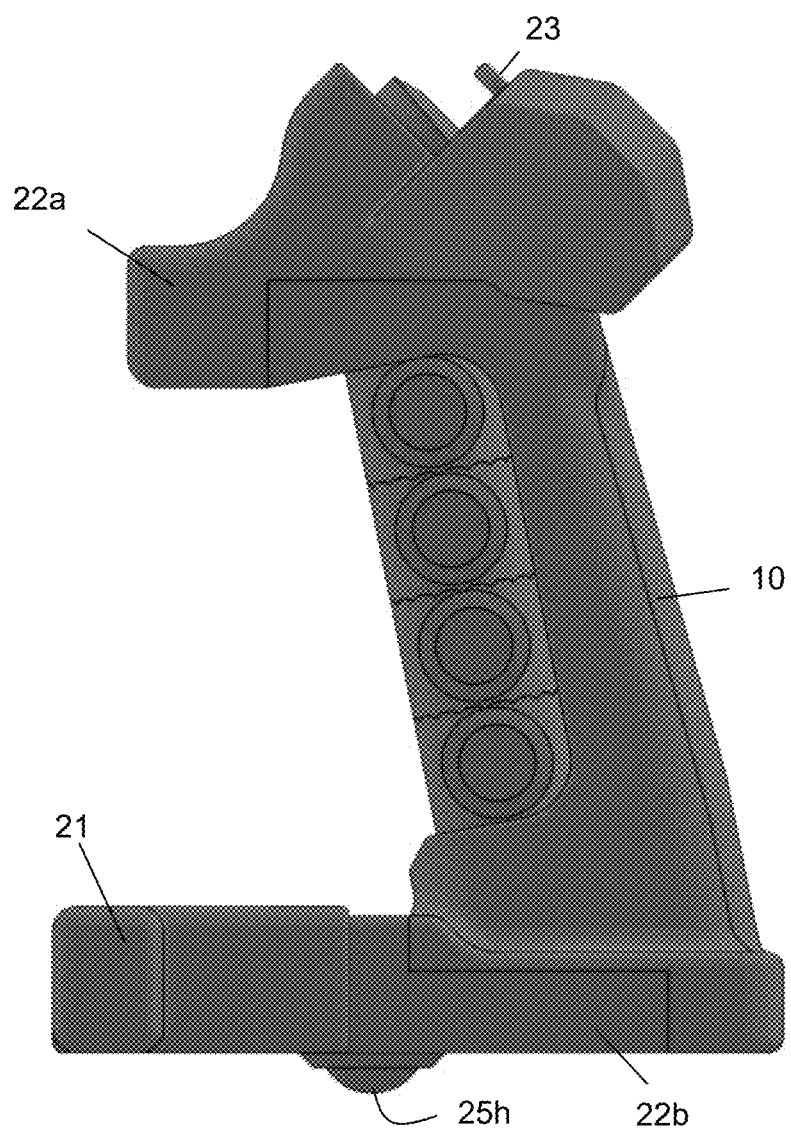
FIGS. 6a-6f are perspective views illustrating a controller base with one or more attached accessories in accordance with some embodiments of the presently disclosed subject matter.

Any desired accessory can be attached to the base as set forth above. In some embodiments, the attachments include additional buttons that allow for more varied gameplay. Please see, for example, FIGS. 6a-6f that illustrate the controller comprising a variety of accessories that can be interchanged as desired. FIG. 6a illustrates one embodiment of a controller that includes removable circuit board 21 and an accessory comprising rollerball 25h positioned on a bottom face of the controller. The rollerball enables a user to move the controller to contact the bottom controller face with a support (such as a table, the user's leg), allowing the rollerball to be maneuvered by the user. The controller also includes an additional accessory that includes a thumb stick input 23 for the user. The term "thumb stick" refers to a joystick that can be operated using a user's thumb. The accessory can be an upper accessory 22a or a lower accessory 22b.

Figure 6B:
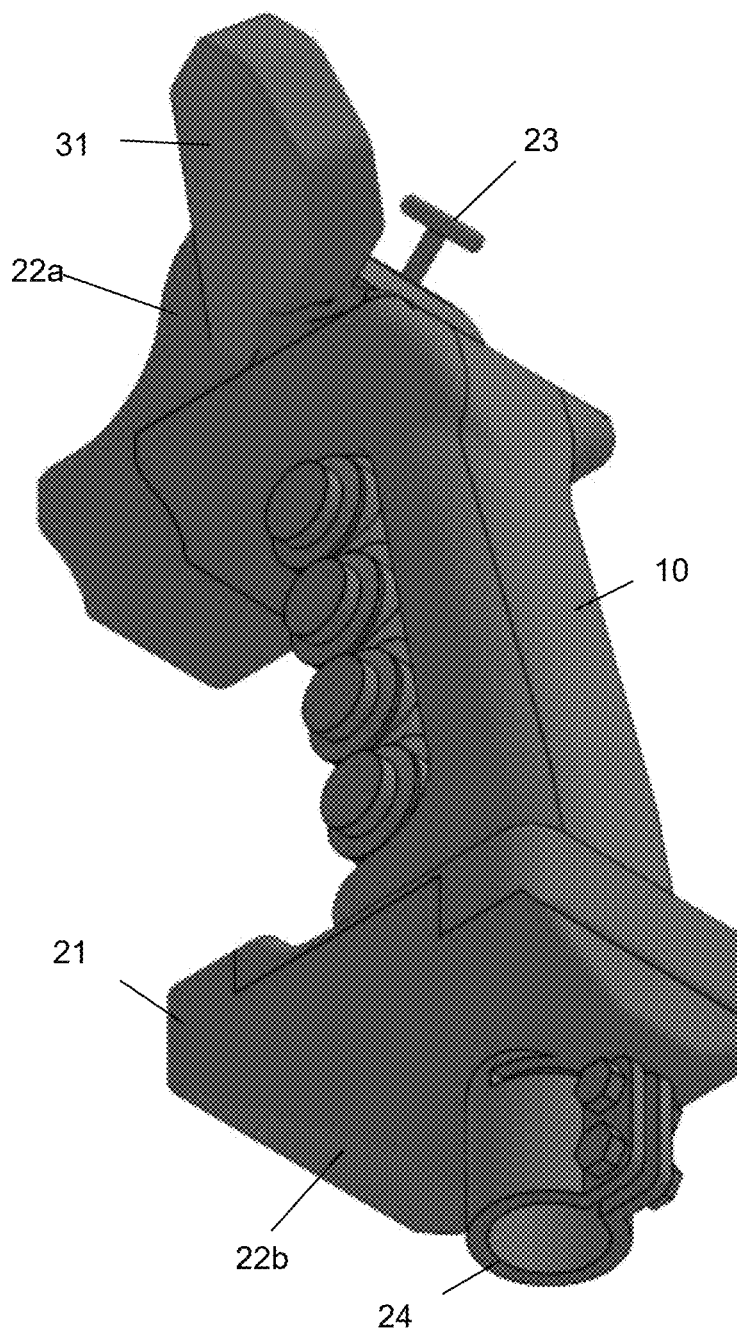

FIG. 6b includes a controller comprising an accessory that includes control stick 24 positioned on a bottom face. The control stick is configured to fasten over a top of an existing control stick. A user can then move a knob, lever, or handle and remove and fasten the sleeve over the top of a handle. In some embodiments, two locking bolts or other fasteners can fasten the sleeve. The sleeve can be useful in a variety of applications that use control sticks, such as vehicles. A user can thus swap out a plain handle and replace it with the controller of FIG. 6b, allowing the user more control with one hand. The accessory can also include ledge 31 that provides additional buttons accessible by the user's thumb.

Figure 6C:
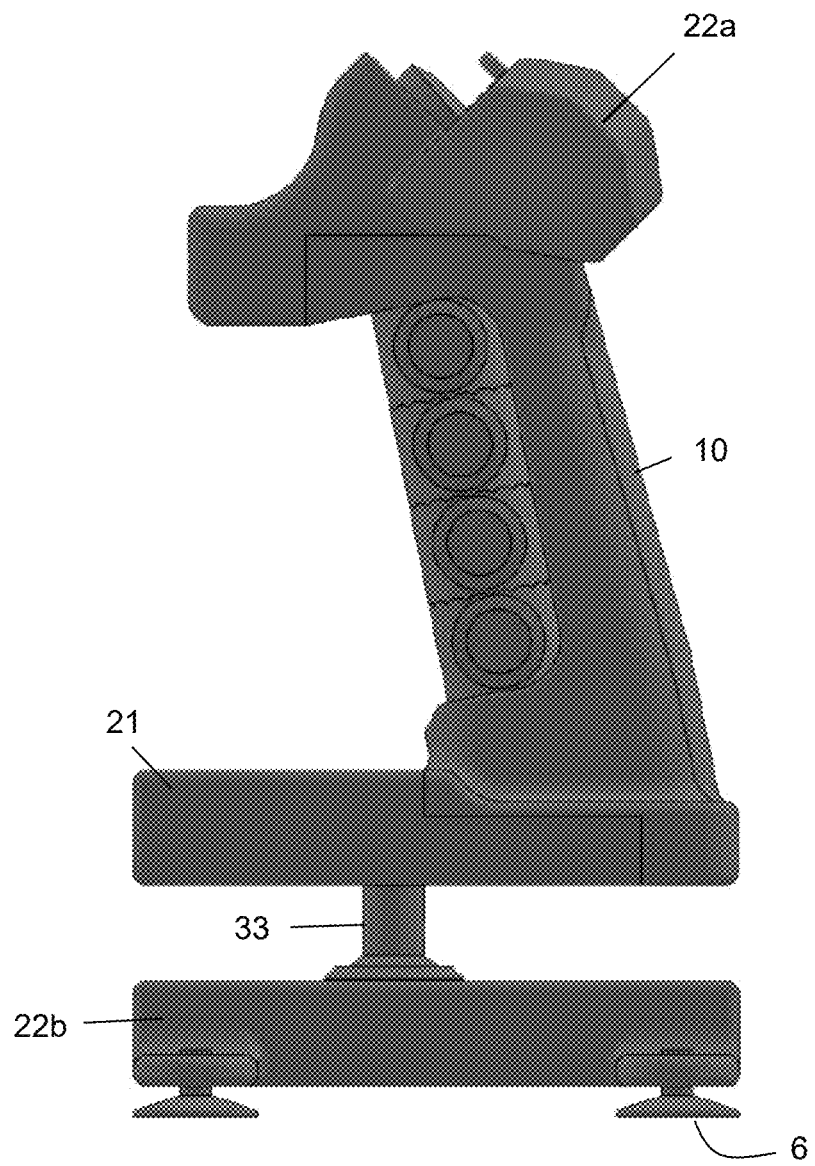

In some embodiments, the controller can be configured as a joystick, as shown in FIG. 6c. As shown, the controller includes a lower accessory 22b that is removably attached to a support surface (such as a table) using suctions 6 or any other conventional mechanism. In this way, the entire handle portion can control the joystick shaft 33.

Figure 6D:
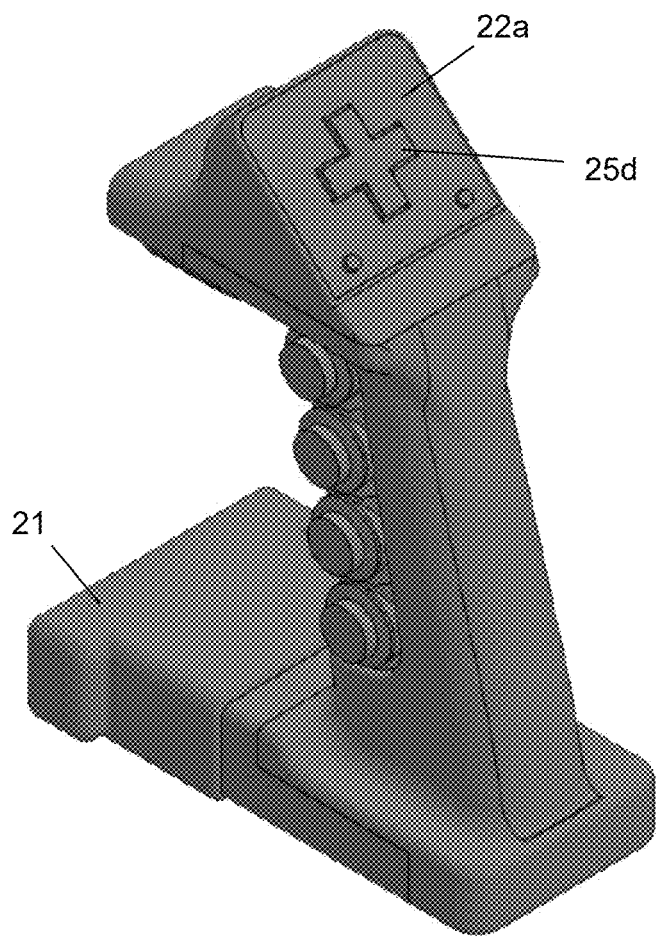

FIG. 6d illustrates a controller with an accessory comprising a thumb directional pad and buttons.

Figure 6E:
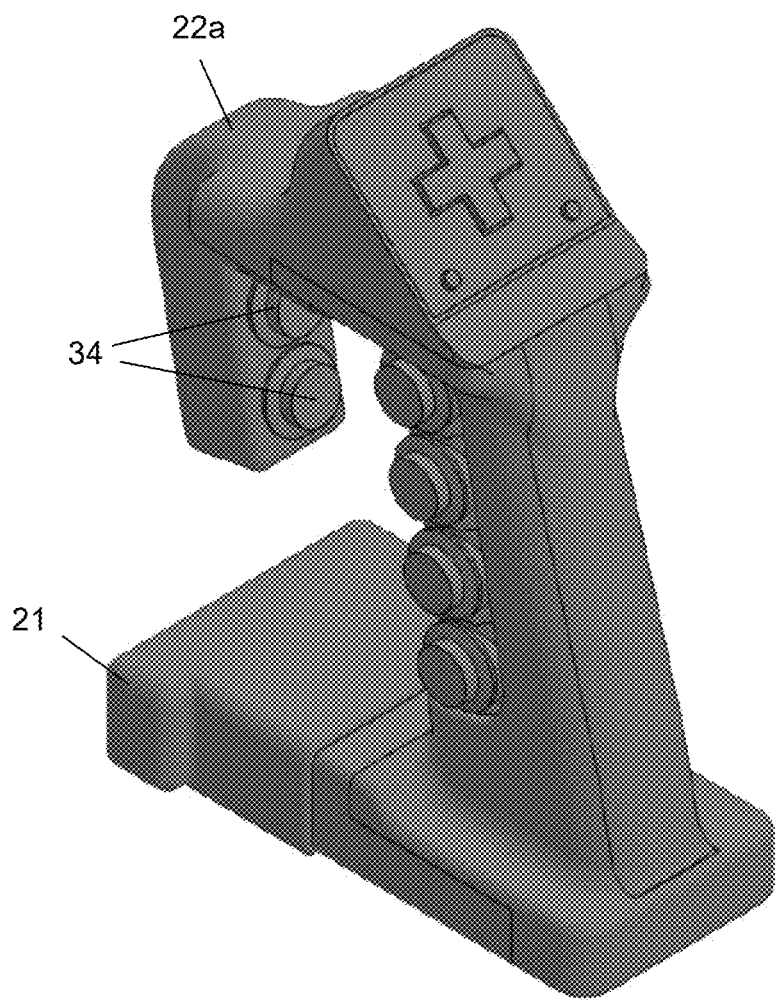

FIG. 6e illustrates one embodiment of an accessory that provides additional buttons in front of the user's fingers. In use, a user can push secondary buttons 34 using the back of their fingers to actuate a variety of movements. Thus, a user's fingers are not limited to a single button.

Figure 6F:
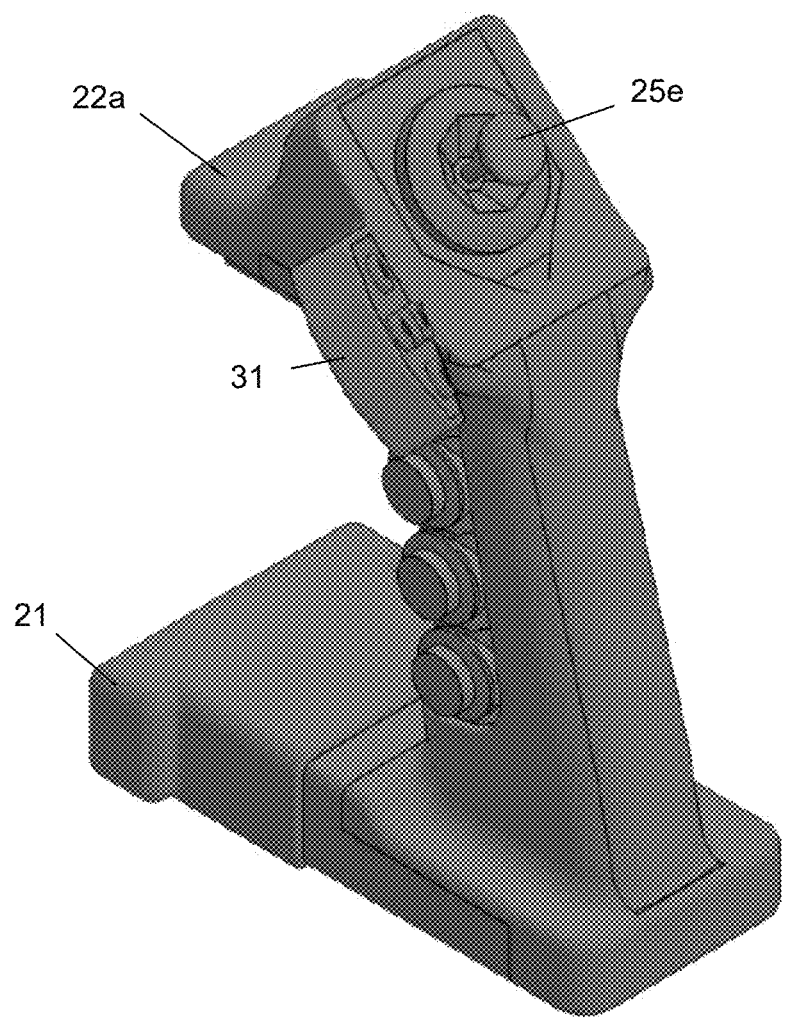

FIG. 6f illustrates a controller that includes an accessory that provides an analog stick button 25e that can be accessed by a user's thumb, and a ledge 31 to the left or right of the analog stick that includes extra buttons, a directional pad, or any other element. The user's thumb can therefore access a wide variety of buttons.

The controller also includes a removable circuit board 21, allowing for use across several different platforms (e.g., gaming platforms), as noted above. A removable circuit board makes it easier for a user to swap between different receivers or machines because each circuit board can be prepared for a desired device, software, and/or machine. The removable circuit board ensures that transfer is much more efficient and quicker. Thus, instead of having a single dedicated circuit board that handles each aspect of the controller, a user can swap out different removable circuit boards allowing for a variety of different applications. Thus, different removable circuit boards can confer different capabilities to the controller.

Controller 5 can be powered using any suitable mechanism. For example, the controller can include one or more battery compartments for receiving and holding rechargeable or non-rechargeable batteries. The battery compartment may include one or more electrodes (e.g. conventional electrodes) that are configured to contact electrically conductive surfaces of the battery received inside the compartment. The battery compartments are selectively accessible by removal of a latch cover whereby the battery compartments and the batteries are accessible only when the player removes a removable battery cover or latch mechanism concealing the battery compartment from external view. In other embodiments, at least one power source may comprise a power connector. The power connector may include an external power cable which may be plugged into an outlet.

The disclosed controller can have any desired dimensions, such as a height (e.g., the distance between the lowest face and the highest face) of about 5-15 inches (e.g., at least/no more than about 5 6, 7, 8, 9, 10, 11, 12, 13, 14, or 15 inches). Similarly, the controller can include any desired width (e.g., the distance between a front and rear face), such as about 3-15 inches (e.g., at least/no more than about 3, 4, 5, 6, 7, 8, 9, 10, 11, 12, 13, 14, or 15 inches). However, it should be appreciated that the dimensions of controller 5 are not limited to the ranges given herein.

Controller 5 can be constructed from any desired material, such as (but not limited to) one or more rigid materials selected from carbon fiber, plastic (such as injection-molded polycarbonate (PC)/acrylonitrile butadiene styrene (ABS) or polyamide (nylon)), metal (e.g., stainless steel), or combinations thereof. The material may be selected based on one or more of heat resistance, mechanical strength, or rigidity for continuous playing of interactive games without degradation or deformation of the controller.

Controller 5 can be manufactured by methods of injection molding, 3D printing, or other suitable manufacturing methods.

Figure 7:
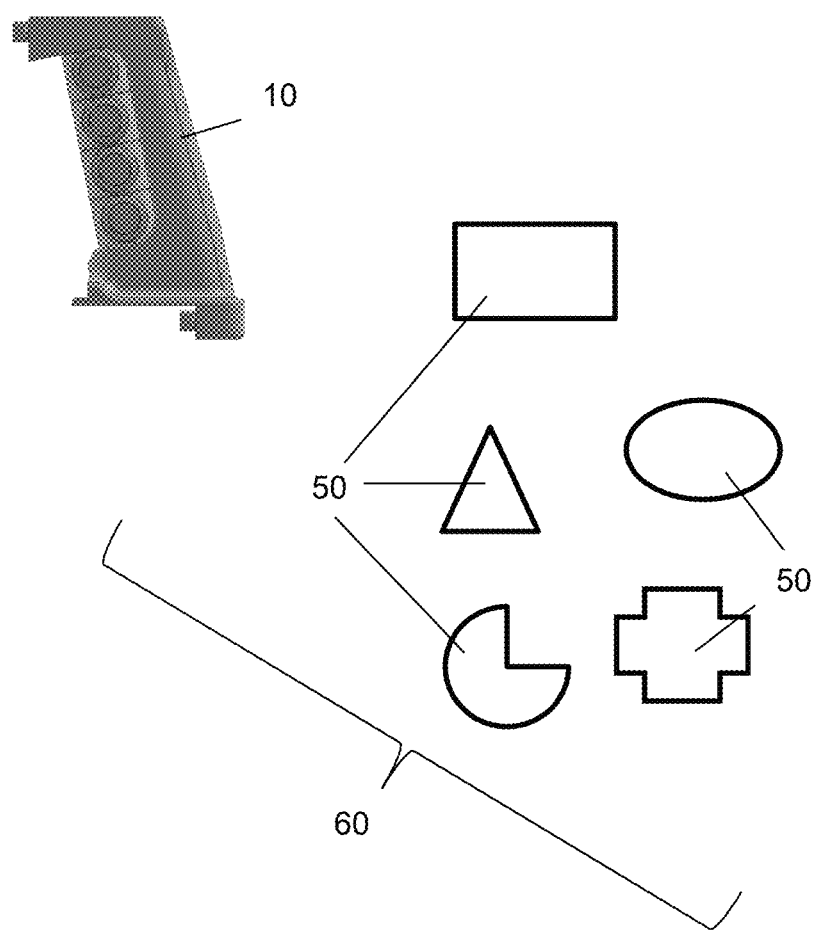
FIG. 7 is a representation of a kit that includes a controller base that can be paired with a variety of accessories in accordance with some embodiments of the presently disclosed subject matter.

In some embodiments, the device can be configured as kit 60 that includes base 10 and a variety of accessories 50 that can be attached or removed from the base as needed for a particular application, as shown in FIG. 7.

In use, controller 5 is grasped by a user's left or right hand. The user's fingers can wrap around the base to grip one or more buttons 25. As noted above, the buttons may be rotated about the base as desired to increase comfort and/or accommodate for a particular disability (e.g., reduced mobility in one or more fingers, loss of a finger, switch between left and right handed users). One or more accessories can then optionally be removably coupled to the base. For example, a desired first accessory can be releasably attached to top face 11 of the base. A desired second accessory can further be releasably attached to the bottom face of the base in some embodiments. Once the accessory or accessories are coupled to the base, the controller can be effectively used by the operator with any type of gaming apparatus, platform, or system.

The controller advantageously provides all the possible buttons for a desired application (e.g., playing a video game) on one device, accessible by the fingers of a single hand (as opposed to modern controllers that require both hands for effective use). Stated another way, controller 5 allows the fingers of a user's single hand to reach any button on the base or on an accessory. Further, the buttons on the base and the corresponding accessory buttons can be arranged as desired for best results either in specific applications or depending on what the user finds most comfortable.

Once the controller has been assembled, the user can depress buttons or otherwise manipulate the buttons to generate certain input signals to control an associated device (e.g., video game, drone). Once the user is finished using the controller, or when a user switches uses of the controller (e.g., uses the controller to fly a drone and then play a video game), one or more accessories can be removed or replaced with different features suitable for a second application. When the user is finished using the controller, the accessories can be removed from the base and the controller stored for later use.

The controller is not limited to gaming applications and can be effective with any type of device to be controlled (e.g., robotics, etc.).

Controller 5 offers many advantages over conventional controllers. For example, the disclosed controller can be easily and effectively used by individuals that are missing one arm/hand or those with limited arm/hand mobility. The disclosed controller combines the features of standard controllers that require two-hand use into a controller that can be used with a single hand. Thus, a single controller has all of the features (e.g., buttons and capabilities) of conventional dual controllers.

Controller 5 is simple to use, such that even children and the elderly can enjoy the device.

The disclosed controller is also durable, allowing for continued long term use by an operator.

Accessories can be easily and quickly attached and removed from the base as needed during game play without the use of any tools or complicated mechanisms.

Controller 5 is ergonomically shaped, providing for comfortable use in the right or left hand of a user.

Many modifications and other embodiments of the inventions set forth herein will come to mind to one skilled in the art to which these inventions pertain having the benefit of the teachings presented in the foregoing descriptions and the associated drawings.

Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A controller defined by:
a base comprising:
a top surface comprising an upper contact that provides for releasable attachment of an associated first accessory;
an opposed bottom surface comprising a lower contact that provides for releasable attachment of an associated second accessory;
an elongated handle positioned adjacent to the top surface, the handle comprising a plurality of rotatable handle buttons positioned on one face of the handle between a top surface of the handle and an opposed bottom surface of the handle;
a foundation positioned between the handle and the bottom surface;
one more accessories comprising a plurality of accessory buttons, wherein each accessory is configured to releasably attach to the upper contact, lower contact, or both;
wherein the handle buttons are configured to rotate from a first orientation to a second orientation to accommodate left and right handed use while a remainder of the handle remains stationary.

2. The controller of claim 1, wherein the handle is angled relative to the top surface and the foundation.

3. The controller of claim 1, wherein the handle buttons are positioned vertically on the handle.

4. The controller of claim 1, wherein the handle buttons are selected from push buttons, toggle switches, triggers, directional pads, analog sticks, joysticks, touchscreens, rollerballs, or combinations thereof.

5. The controller of claim 1, wherein the accessory buttons are selected from push buttons, toggle switches, triggers, directional pads, analog sticks, joysticks, touchscreens, rollerballs, or combinations thereof.

6. The controller of claim 1, wherein each handle button is rotatable about 180 degrees from the first orientation to the second orientation.

7. The controller of claim 1, wherein each handle button is independently rotatable relative to one or more other handle buttons.

8. The controller of claim 1, wherein each handle button is configured to rotate up to about 180 degrees from the first orientation to the second orientation.

9. The controller of claim 1, wherein the base top surface and bottom surface include planar regions.

10. The controller of claim 1, wherein the upper contact comprises an indented region and the lower region includes a cutout region.

11. The controller of claim 1, configured as a video game controller.

12. A method of performing an action on a receiving system using the controller of claim 1, the method comprising:
adjusting the rotatable handle buttons to accommodate one or more fingers of a user;
releasably attaching at least one of the accessories to the top contact, lower contact, or both;
wherein the receiving system can be controlled using a single hand of a user and wherein the single hand of the user has access to both the handle buttons and the accessory buttons.

13. The method of claim 12, wherein the accessories are releasably attached using as snap fit, push fit, magnets, mechanical elements, or combinations thereof.

14. The method of claim 12, wherein the handle is angled relative to the top surface and the foundation.

15. The method of claim 12, wherein the handle buttons are positioned vertically on the handle.

16. The method of claim 12, wherein the handle buttons are selected from push buttons, toggle switches, triggers, directional pads, analog sticks, joysticks, touchscreens, rollerballs, or combinations thereof.

17. The method of claim 12, wherein the accessory buttons are selected from push buttons, toggle switches, triggers, directional pads, analog sticks, joysticks, touchscreens, rollerballs, or combinations thereof.

18. The method of claim 12, wherein each handle button is rotatable about 180 degrees from the first orientation to the second orientation.

19. The method of claim 12, wherein each handle button is independently rotatable relative to one or more other handle buttons.

20. The method of claim 12, wherein each handle button is configured to rotate up to about 180 degrees from the first orientation to the second orientation.

* * * * *